(12) United States Patent
Yang

(10) Patent No.: US 7,027,036 B2
(45) Date of Patent: Apr. 11, 2006

(54) KEYPAD FOR MOBILE PHONE

(75) Inventor: Yoon-Hong Yang, Seoul (KR)

(73) Assignee: Youeal Electronics Co., Ltd., Paju-city (KR)

(*) Notice: Subject to any disclaimer, the term of this patent is extended or adjusted under 35 U.S.C. 154(b) by 538 days.

(21) Appl. No.: 10/145,796

(22) Filed: May 15, 2002

(65) Prior Publication Data
US 2002/0175899 A1 Nov. 28, 2002

(30) Foreign Application Priority Data
May 22, 2001 (KR) .................. 2001-27898

(51) Int. Cl.
G09G 5/00 (2006.01)
(52) U.S. Cl. .................. 345/170; 341/22; 455/550.1
(58) Field of Classification Search ........ 345/168–172; 341/22–26; 455/550.1–556
See application file for complete search history.

(56) References Cited

U.S. PATENT DOCUMENTS

| 4,022,993 A | * | 5/1977 | Shattuck ............ 200/314 |
| 5,225,818 A | * | 7/1993 | Lee et al. ............ 345/170 |
| 5,613,599 A | * | 3/1997 | Inagaki et al. ............ 200/512 |
| 5,669,486 A | * | 9/1997 | Shima ............ 200/314 |
| 6,416,196 B1 | | 7/2002 | Lemarchand et al. |
| 6,452,341 B1 | * | 9/2002 | Yamauchi et al. ....... 315/169.1 |

FOREIGN PATENT DOCUMENTS

| EP | 0 917 409 A1 | 5/1999 |
| EP | 0 981 144 A1 | 2/2000 |
| EP | 1 017 075 A2 | 7/2000 |
| KR | 1020010039294 A | * 5/2001 |
| WO | WO 00/11689 | 3/2000 |
| WO | WO 02/15211 A1 | 2/2002 |

OTHER PUBLICATIONS

European Search Report for EP 02 01 0512, dated Feb. 25, 2003, corresponding to the above-identified application.

* cited by examiner

Primary Examiner—Alexander Eisen
(74) Attorney, Agent, or Firm—Christie, Parker and Hale, LLP

(57) ABSTRACT

A keypad for a mobile phone includes a circuit board having a fixed contact point; a dome switch disposed on the circuit board; a base pad member having a projection for pressing the dome switch to generate signal; an upper pad member having a key top, the upper pad member being integrally formed with the base pad member, and an EL element disposed surface-contacting between the base pad member and the upper pad member.

9 Claims, 4 Drawing Sheets

KEYPAD FOR MOBILE PHONE

CROSS-REFERENCE TO RELATED APPLICATION

This application claims priority of Korean Patent Application No. 2001-27898, filed on May 22, 2001.

BACKGROUND OF THE INVENTION (a) Field of the Invention

The present invention relates to a keypad for a mobile phone and, more particularly, to a keypad that has a sheet-type luminous element (an EL element) formed in a thin sheet and integrated therein, thereby minimizing noise and vibration generated by the EL element.

(b) Description of the Related Art

Generally, a keypad for a mobile phone is an input device consisting of a separate grid of numerical and function keys arranged for efficient data entry. The keys are fitted into holes formed on a front housing of the mobile phones and jutted out so that users can conveniently input the data.

Light source formed of a luminous element is installed on the bottoms of the key so that the user can identify the numerical numbers and letters printed on the keys in a dark place. When the light source is turned on, the light is emitted to the letters and numerical numbers printed on the keys by the backlight effect, thereby making the users identify them.

FIG. 7 shows one of keys constituting a conventional keypad for a mobile phone.

A key 50 generally comprises a base 52, a key top 54 elevated from the base 52, and a projection 56 formed on a bottom center of the key top 54.

The base 52 and the key top 54 are integrally formed by a connecting portion 58. The connecting portion 58 is designed to be thinner than the base 52 for the effective operation of the key 50. A printing layer 60 of letters and numerical numbers is formed on a top surface of the key top 54 through a silkscreen printing or a laser marking.

The base 52 is provided at its bottom surface with a groove 62 in which a light source formed of an LED lamp is installed.

A dome switch 68 is located under the projection 56, and a fixed contact point 70 formed on a printed circuit board 64 is located under the dome switch 68.

When using the mobile phone, the light source 66 is applied with electric power to provide backlight to the keypad, making it possible to see the printing layer 60 with the letters and numerical numbers formed on the key top 54 even in the dark place.

When pushing the key 50, the projection 56 formed on the bottom of the key 50 overcomes the elastic formed of the dome switch 68 and pushes the dome switch 68 so that the dome switch 68 contacts the fixed contact point 70, thereby generating a signal.

When releasing the pushing force applied to the key 50, the key 50 is returned to its initial position by the self-elastic force of the connecting portion 58 and the dome switch.

However, in the conventional keypad, since a groove is formed on the bottom surface of the base 52 and the light source formed of the LED lamp is installed in the groove, the thickness of the keypad is increased as many as the thickness of the light source.

Furthermore, since the key 50, the dome switch 68, and the printed circuit board 64 are disposed in the front housing of the mobile phone, and a part of the key 50 is exposed out of the front housing, it is time consuming to assemble all of the members, thereby deteriorating the productivity.

To solve the above-described problem, a keypad for a communication device, which is provided with a sheet-type luminous element (an EL element) that is designed such that a spacer having opposite adhesive surfaces is attached on a circuit board and a backlight is provided on the spacer, has been proposed. However, a special assembling process for attaching the spacer is required, and the thickness of the keypad is increased as many as the thickness of the spacer.

Furthermore, a dome switch, a moving contact point, and a fixed contact point that are constituting the luminous element are not sealed, this causes the mobile phone's life to be reduce and also causes a shielding process for preventing the noise and vibration caused by current applied to the luminous element to be required.

SUMMARY OF THE INVENTION

The present invention has been made in an effort to solve the above-described problems of the conventional art.

It is an objective of the present invention to provide a keypad that is designed to be produced with less expense and to minimize the thickness thereof by integrating a thin film EL element thereinto.

It is another objective of the present invention to provide a keypad that can enhance the reliability and increase its life by preventing the noise and vibration generated by an EL element.

To achieve the above objectives, the present invention provides a keypad for a mobile phone, comprising a circuit board having a fixed contact point; a dome switch disposed on the circuit board; a base pad member having a projection for pressing the dome switch to generate signal; an upper pad member having a key top, the upper pad member being integrally formed with the base pad member; and an EL element disposed surface-contacting between the base pad member and the upper pad member.

According to a preferred embodiment of the present invention, a diffusing layer is formed on the EL element and a printed film is located on the EL element.

According to another preferred embodiment, the EL element is integrally formed with the base pad member, and the key top is attached on the EL element.

Preferably, the base pad member and the key top are formed of a material selected from at least one of silicon rubber and synthetic resin.

DETAILED DESCRIPTION OF THE PREFERRED EMBODIMENTS

Preferred embodiments of the present invention will be described more in detail hereinafter in conjunction with the accompanying drawings.

Figure 1:
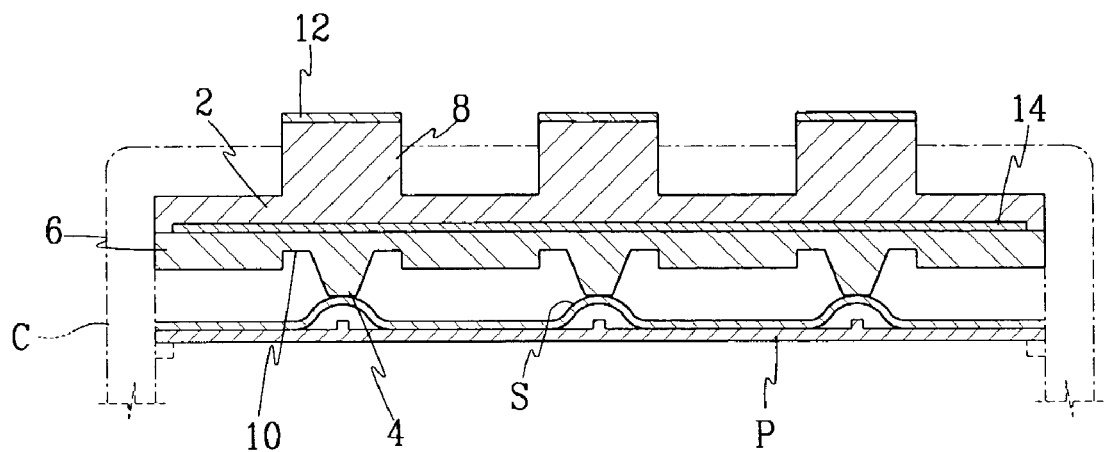
FIG. 1 is a sectional view of a keypad for a mobile phone according to a first embodiment of the present invention.
Figure 2:
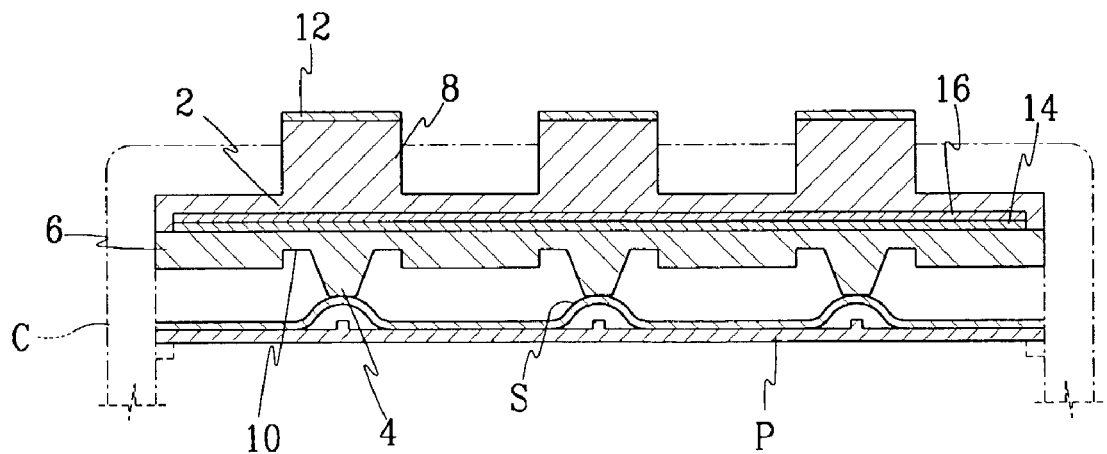
FIG. 2 is a sectional view for illustrating a diffusing layer printed on a keypad of FIG. 1.

FIGS. 1 and 2 show a keypad according to a first embodiment of the present invention. A keypad of this embodiment may be formed of silicon rubber.

A keypad of this embodiment comprises an upper pad member 2 having plural key tops 8 pressed or touched by a user and a base pad member 6 disposed opposing the upper pad member 2, and an EL element 14 integrally disposed between the upper and base pad members 2 and 6.

The key tops 8 of the upper pad member 2 are arranged to maintain their space at a predetermined distance and elevated upward passing over a front cover and spaced away from each other at a predetermined distance. The base pad member 6 is provided with plural projections 4 corresponding to the key tops 8.

The projections 4 are located such that they can press corresponding dome switch S provided on a circuit board P by the user pressing the key tops 8.

The base pad member 6 is further provided with groove portions 10 for providing the elastic force and the restitutive force to the key top 8.

A printed layer 12 with numerical numbers or letters is formed on the key tops 8. The printed layer 12 is formed by a spray printing method, a laser marking method, or a silk screen-printing method.

A thin film EL element 14 for the backlighting is disposed between the upper and base pad members 2 and 6.

When electric field is applied to the EL element 14, the electrons and electron holes are coupled to emit light from the surface. Since the EL element 14 is capable of being driven even by low voltage as well as providing the wide view angle, it can be widely applied. Furthermore, since the EL element 14 is formed of a thin sheet, the occupying space in the mobile phone can be minimized when compared with the conventionally used LED lamp, thereby making it possible to make the phone compact.

Describing the method for inserting the EL element 14 to integrate with the keypad, the base pad member 6 is first formed using a low mold (not shown), and then the EL element 14 that is shorter than the pad member 6 is disposed on the pad member 6. Next, silicon rubber liquid is poured on the EL element 14 and pressed by a mold in the shape of the base pad member 6, thereby forming the base pad member 6.

Next the silicon rubber liquid is pressed by a mold in the shape of the key top, thereby forming the key top and attaching the base pad member 6 to the upper pad member 2. As a result, the EL element 14 makes tight surface contacts between the base pad member 6 and the upper pad member 2.

The EL element is an alternating current planar light source driven by a predetermined driving voltage and frequency, inevitably generating the noise and vibration. However, in the present invention, the EL element 14 is disposed between and tightly contacting the base pad member 6 and the upper pad member 2, thereby alleviating the noise and the vibration.

In addition, as shown in FIG. 2, a diffusing layer 16 may be formed on the EL element to allow the light emitted from the EL element 14 to be diffused, thereby enhancing the backlighting effect.

Figure 3:
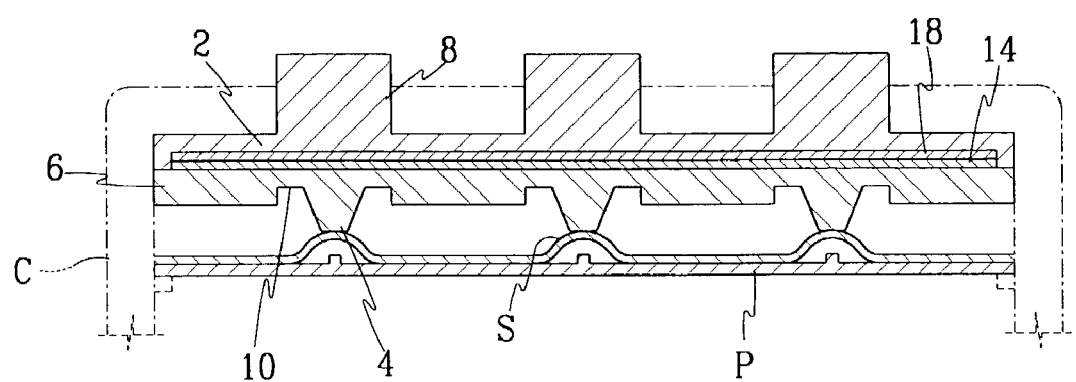
FIG. 3 is a sectional view for illustrating a printing film installed in a keypad of FIG. 1.

In the first embodiment, the printing layer 12 is printed on the key tops 8. However, as shown in FIG. 3, a printing film 18 with letters and numerical numbers may be integrated on the EL element 14.

By integrating the printing film 18 on the EL element 14, the letters and numerical numbers can be more clearly shown.

Figure 4:
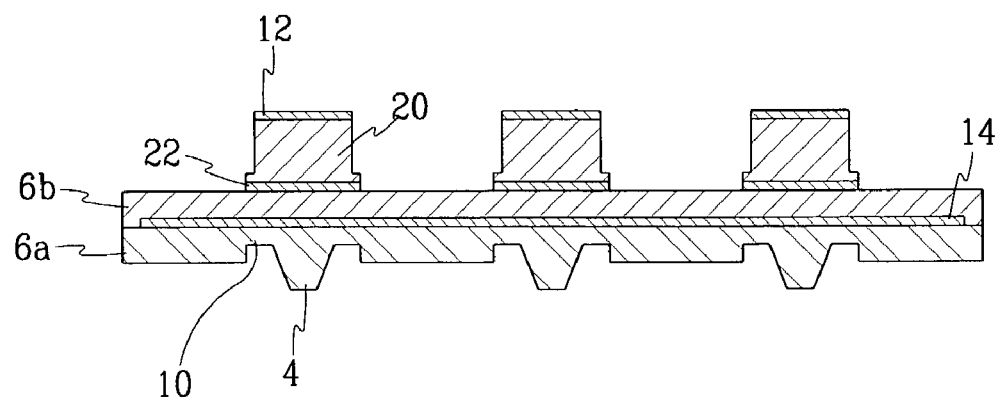
FIG. 4 is a sectional view of a keypad for a mobile phone according to a second embodiment of the present invention.
Figure 5:
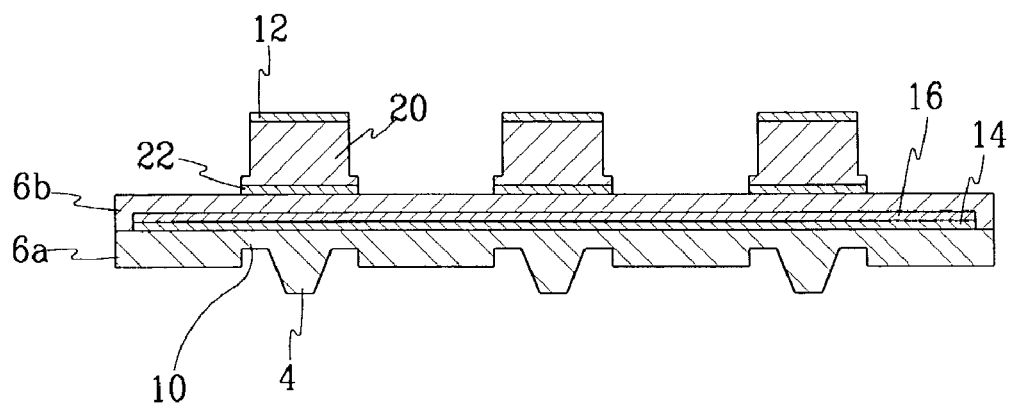
FIG. 5 is a sectional view for illustrating a light guide layer printed on a keypad of FIG. 4.

FIGS. 4 and 5 show a second embodiment of the present invention.

The keypad of the second embodiment is identical to that of the first embodiment except that the key tops are formed of a different material from that of the pad members.

That is, the key pad of this second embodiment comprises a base pad member 6a formed of silicon rubber, an upper pad member 6b integrally formed with the base pad member 6a, and key tops 20 formed of synthetic resin, the key tops 20 being attached on the upper pad member 6b by adhesive 22.

In this embodiment, the EL element 14 is also surface-contacted with the pad members.

Figure 6:
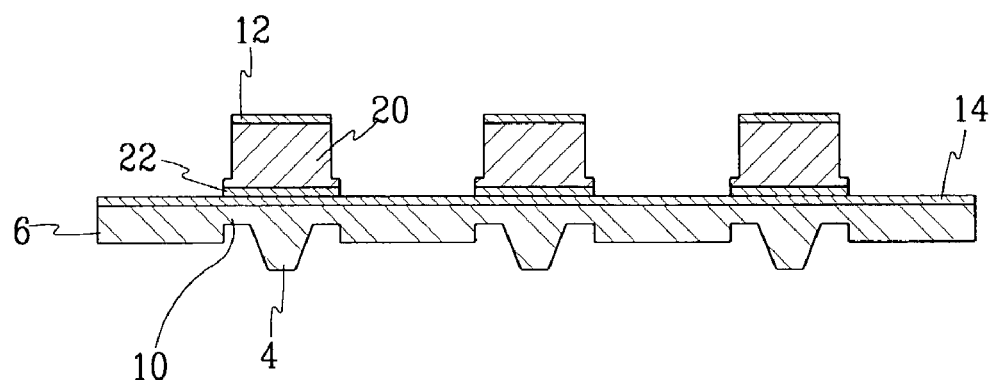
FIG. 6 is a sectional view of a keypad for a mobile phone according to a third embodiment of the present invention.
Figure 7:
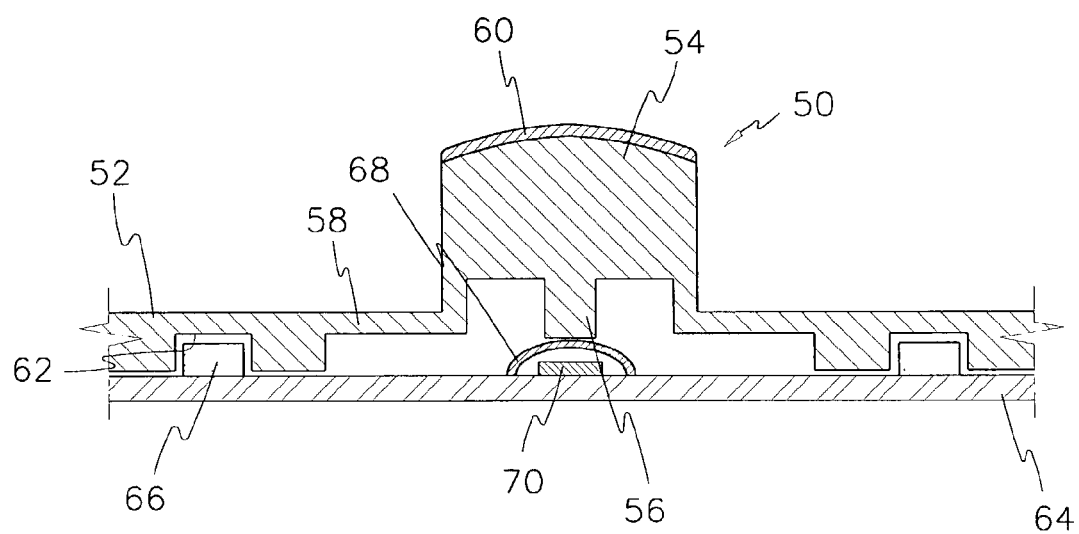
FIG. 7 is a sectional view of a conventional keypad for a mobile phone.

FIG. 6 shows a keypad according to a third embodiment of the present invention.

In third embodiment, the EL element 14 having a length identical to that of a base pad member 6 formed of silicon rubber is integrally surface-contacted with the EL element 14. A key tops 20 formed of synthetic resin is attached on the EL element by adhesive 22.

As described above, as the thin EL element is integrally inserted into the keypad, the thickness of the keypad can be minimized while simplifying the assembling and manufacturing process, thereby improving the productivity.

In addition, since the EL element is tightly disposed contacting between the base and upper pad members, the noise and vibration caused by the EL element can be suppressed, thereby improving the reliability and endurance of the element.

What is claimed is:

1. A keypad for a mobile phone, comprising:
   a circuit board having a fixed contact point;
   a dome switch disposed on the circuit board;
   a base pad member having a projection for pressing the dome switch to generate a signal;
   an upper pad member having a key top, the upper pad member being integrally formed with the base pad member; and
   an EL element disposed between the base pad member and the upper pad member, the EL element being above the projection of the base pad member and a surface contacting both the base pad member and the upper pad member.

2. A keypad of claim 1, further comprising a diffusing layer, wherein the diffusing layer is separately formed on the EL element.

3. A keypad of claim 2 wherein the El element emits a backlight to the upper pad member, the back light allowing the upper pad member to be seen in a dark place.

4. A keypad of claim 1, further comprising a printed film, wherein the printed film is located on the EL element and covered by the upper pad member.

5. A keypad of claim 1 wherein the EL element is integrally formed with the base pad member, and the key top is attached on the EL element.

6. A keypad of claim 1 wherein the base pad member and the key top are formed of a material selected from at least one of silicon rubber and synthetic resin.

7. A keypad of claim 1, wherein the EL element is integrated with the base pad member in a first mold and wherein the EL element is placed in the first mold before a first material forming the base pad member is placed in the first mold.

8. A keypad of claim 1 wherein the EL element is a sheet-type luminous element for minimizing a space occupied.

9. A keypad of claim 1 wherein the base pad member has an upper surface and the upper pad member had a bottom surface and wherein the EL element is in tight surface-contact with both the upper surface of the base pad member and the bottom surface of the upper pad member.

* * * * *